Oct. 1, 1968    L. A. HOLDER    3,403,435

TIRE STUD AND METHOD FOR INSTALLING SAME

Filed March 21, 1966

INVENTOR.
LORRAIN A. HOLDER

BY *Meyer, Tilberry & Body*

ATTORNEYS

United States Patent Office 3,403,435
Patented Oct. 1, 1968

3,403,435
TIRE STUD AND METHOD FOR
INSTALLING SAME
Lorrain A. Holder, Willoughby Hills, Ohio (% The Die Cast Finishing Co., 4150 Hough Ave., Cleveland, Ohio 94103)
Filed Mar. 21, 1966, Ser. No. 536,025
3 Claims. (Cl. 29—450)

ABSTRACT OF THE DISCLOSURE

An improved tire stud and method for installing the same in a preformed opening in a tire tread. The stud includes a shank provided with an improved head having a maximum diameter of three to five times the diameter of the preformed opening and of a generally conical shape with the included angle of the cone being between 80–115°. The method for installing includes providing a tool having an outer diameter equal to or less than the head diameter and an opening sized to receive the shank. The shank is positioned in the tool opening and the conical head positioned in engagement with the preformed tread opening. By application of an axial force on the tool the head dilates the tread opening and is positioned therein, after which, the tool is withdrawn.

---

This invention pertains to the art of automobile tires and more particularly to a tire stud for such tires and a method and tool for installing same.

There has recently been developed for use in automobile snow tires a stud which is inserted into preformed openings in the tread surface and which project outwardly slightly beyond such surface to improve the traction of such tires, particularly on ice and snow. Such studs heretofore included a cylindrical shank of aluminum having at the outer end a tungsten carbide insert and at the inner end an enlarged head which is embedded in the walls of the tire tread opening for the purpose of retaining the stud in the opening under the very high centrifugal forces developed on the stud when the tire is rotating at high speeds.

The preformed holes in the tread surface have a diameter of between 0.090 to 0.100 inch. The shank of the stud has a diameter of approximately 0.200 inch and the head has a diameter of approximately 0.350 inch. Heretofore the surface of the head had a slight curvature although some patents have shown the surface of the head as being almost hemi-spherical.

With the diameter of the head being at least three and one-half times the diameter of the opening, difficulty has been experienced in the past in satisfactorily inserting the stud into the opening. Thus, if the stud were not inserted all the way to the bottom of the opening, it then projected out beyond the surface of the tread too far making it necessary to remove and reinsert it. Further, if the stud were not inserted straight into the opening, that is to say its axis parallel with the axis of the opening, the stud remained crooked in the opening and this was also considered unsatisfactory.

Heretofore studs have been inserted into the tire by a rather complicated air powered tool comprised of three long tapered fingers which were inserted into the opening of the tire in a cluster. Air power applied to the opposite end of the fingers opened them outwardly to dilate the preformed opening and then the stud was forced longitudinally head first through the space formed by the now spaced fingers. When the surface of the head had bottomed in the dilated opening, the fingers were allowed to come against the side of the shank of the stud and then these fingers were withdrawn from the opening allowing the rubber of the tread to contract around the head and the shank of the stud thereby firmly holding the stud in the tire tread.

Difficulty has been experienced in the past with such inserting tools. The fingers were long and slender and in view of the forces involved, quite fragile. In use, they tended to wear so that they needed to be frequently replaced. Further, these tools were expensive, required a source of air pressure and required maintenance.

The present invention contemplates a tire stud and a method and a tool for inserting the tire stud into a preformed opening in the surface of the tread of a tire which overcomes all of the above referred to difficulties and others, is simple and economical and enables the stud to be readily inserted into the tire by anyone of normal strength without the need for an external source of air pressure.

In accordance with the present invention, a tire stud of the general type described is provided wherein the surface of the head is so shaped that it will dilate the walls of the preformed opening when it is pushed longitudinally into the opening with a force which can readily and easily be applied by any normal adult.

The head to be inserted into the opening has a diameter of between three and four times the diameter of the preformed opening in the tire tread and the inner surface is generally in the shape of a cone wherein the included angle of the cone at diameters equal to or greater than the diameter of the opening is between 80–115°. The apex of the cone at diameters less than the diameter of the opening is radiused so as to be blunt.

Furthermore, a tool is provided for inserting such a stud into the opening comprised of a cylindrical member having an opening in one end just large enough to receive the shank of the stud and an outer diameter substantially less than the maximum diameter of the head and preferably as small as possible consistent with adequate strength in the walls of the member defining the opening to receive the shank of the stud.

Further in accordance with the invention, a method of installing tire studs in preformed openings of predetermined diameters in the surface of a tire tread comprising providing a stud having a shank of approximately twice the diameter of the opening and a head having a diameter of from three to four times the diameter of the opening with a conical inner surface having an included angle at the diameter of the opening between 80–115°, providing a tool having an opening to receive the shank of the stud and an outer diameter substantially less than the diameter of the head, positioning the stud so that the apex of the cone is aligned with the preformed opening, pressing axially on the stud with the tool to dilate the walls of the opening and allow the stud to enter the opening, continuing such pressure until the stud is bottomed in the opening and removing the tool.

The principal object of the invention is the provision of a new and improved tire stud which can be inserted into a preformed opening in the surface of a tire tread with a simple tool and with a simple axial force applied thereto.

Another object of the invention is the provision of a new and improved stud having a head so shaped that it will dilate the walls of the preformed opening in the surface of a tire tread with a longitudinal force of reasonable amounts such that a workman can easily install the stud.

Another object of the invention is the provision of a combination of a stud and tool which enables the stud to be readily and easily inserted.

Another object of the invention is the provision of a new and improved method for installing studs in the tread of an automobile tire which is simple and economical and does not require complicated tools for this purpose.

The invention may take physical form in certain parts and arrangements of parts, certain steps and combinations of steps, preferred embodiments of which will be described in this specification and illustrated in the accompanying drawings which form a part hereof and wherein.

Figure 1:
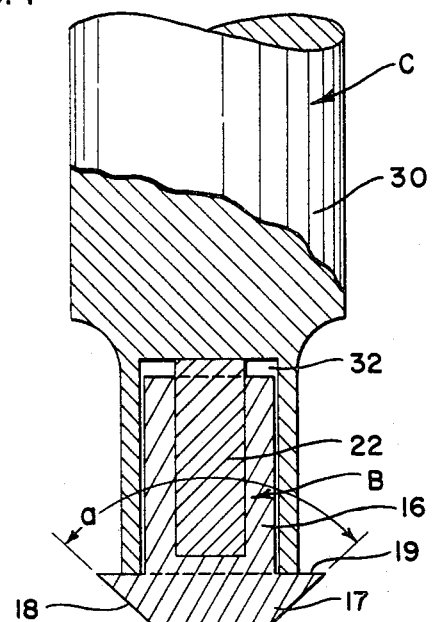
FIGURE 1 is a side view partly in section of the tread of an automobile tire having a preformed stud receiving opening therein and with a stud and inserting tool both illustrating a preferred embodiment of the invention and with the stud about to be inserted in the opening.
Figure 2:
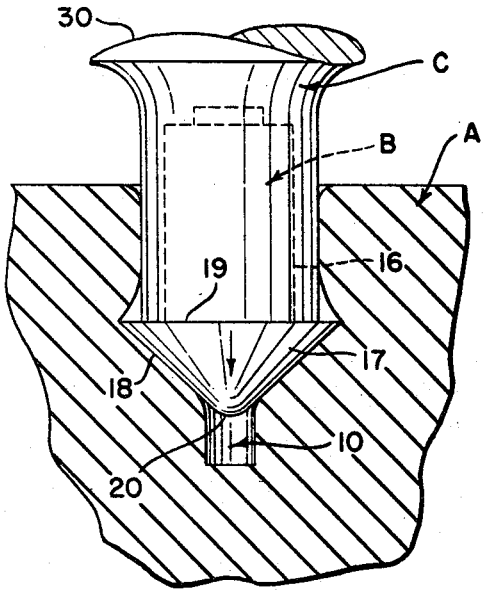
FIGURE 2 is a view similar to FIGURE 1 but showing the stud partly inserted into the opening.
Figure 3:
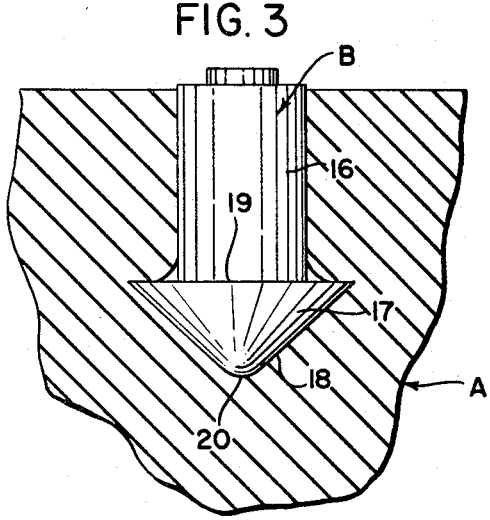
FIGURE 3 is a similar cross-sectional view showing the stud fully inserted and the tool removed; and, FIGURE 4 is a graph showing the relative insertion forces for various included angles of the cone of the surface of the head.

Referring now to the drawings wherein the showings are for the purposes of illustrating a preferred embodiment of the invention only and not for the purposes of limiting same, the figures show the tread A of an automobile tire having a preformed opening 10 of predetermined diameter and depth formed therein, a stud B to be inserted in the opening 10 and a tool C for inserting the stud B in the opening 10.

The tread A and the preformed opening 10 are all conventional and form no part of the present invention. The diameter and depth of the opening 10 will vary with the particular tire manufacturer. Frequently this diameter is between 0.090 and 0.100 inch and the depth is 0.500 inch. Obviously, these dimensions may be varied and in such instances the dimensions of the stud B would be varied in proportional amounts. The dimensions of the stud B set forth hereinafter are based on the stated opening dimensions. However, the angle $a$ remains the same.

The stud A is comprised of a shank 16 and a head 17 and with the exception of the shape of the inner surface of the head, is relatively conventional and forms no part of the present invention. Briefly the head 17 is integral with the shank 16 and has an upper or outer surface 19 and a lower or inner surface 18. The surface 19 is flat and perpendicular to the longitudinal axis of the shank 16. The surface 18 is generally conical with the apex 20 being rounded or formed with a radius.

The cross-sectional shape of the shank 16 may be as desired but is preferably cylindrical. A tungsten carbide rod 22 is imbedded in and extends slightly beyond the outer end of the shank 16. In the preferred embodiment, the diameter of the shank is 0.200 inch and the diameter of the head is 0.350 inch. The diameter of the head 17 will normally need to be such that when the head is inserted in the opening, it will be gripped by the rubber of the tire with sufficient force as to prevent the stud from being ejected from the opening under the centrifugal forces which will be developed at high speeds. About three times the diameter of the preformed opening is necessary.

As the diameter of the head 17 increases, greater difficulty is found in inserting the stud and it is also possible that if the diameter of the head is too large, the rubber surrounding the opening will be stretched beyond its elastic limit and rupture or crack. Thus, the head preferably has a maximum diameter of four to five times the diameter of the preformed opening.

In accordance with the invention, the surface 18 of the head at diameters greater than the diameter of the opening 12 has an included angle $a$ of from 80–115°. In the preferred embodiment the angle is 96°.

Preferably the included angle $a$ of the surface 18 at diameters slightly less than the diameter of the preformed opening 12 is the same as the included angles greater than this diameter. The surface 18 as it approaches the apex becomes tangent with a radius of approximately .070 inch. With this arrangement, the apex of the cone of the head is slightly rounded but with the cone continuing inwardly of the diameter of the preformed opening 10. Locating the stud axially relative to the opening 10 is relatively made easier.

It will be appreciated that if the cone continued to a pointed apex, location of the stud would be even easier but with the sharper point damage to the inner body of the tire might result.

The surface 18 can be slightly curved so that the included angle $a$ outwardly of the opening diameter progressively decreases toward the outer periphery of the head 17.

The tool C is comprised generally of an elongated cylindrical member 30 having a handle, not shown, formed at its outer end. The tool at the other or inner end has an opening 32 of a diameter to just receive the shank of the stud. With the shank in preferred embodiment having a diameter of 0.200 inch, the diameter of this opening 32 is preferably 0.210 inch.

The outer diameter of the tool at least for a length equal to the depth of the preformed opening 12 is as small as possible consistent with a wall thickness of sufficient strength as to not fracture or bend while studs are being inserted into the tire as will be hereinafter described. As the outer diameter is reduced, the insertion force also decreases. An outer diameter of 0.230 inch is preferred.

To insert a stud in accordance with the present invention, the surface of the tread adjacent to the opening 10 is first coated with a lubricant solution by means of a rag or brush. Thereafter the shank 16 of the stud B is inserted into the opening 32 of the tool and the head 17 of the stud is located so that the axis of the stud is parallel to and closely aligned with the axis of the preformed opening 10. The conical taper of the surface 18 of the head assists in this alignment. Once the stud is properly aligned, a force is exerted on the handle aligned with the axis of the opening 10 and this force is transmitted to the stud and thence to the corner 35 which the walls of the opening 10 form with the surface of the tire. The angle of engagement of the surface 18 of the head 17 with this corner 35 is such as to deflect and dilate the rubber and the head moves longitudinally inwardly into the preformed opening 10. The angle $a$ is such, taking into account the elasticity of the rubber and the coefficient of friction, that the head 17 can dilate the rubber forming the walls of the opening an amount equal to the diameter of the head and the stud then commences to move downwardly into the opening. As the outer edge of the head moves through the opening, the dilated walls of the opening collapse against the outer surface of the tool. The outer surface of this tool is preferably highly polished and the friction of the walls against the tool does not appreciably retard the movement of the stud and tool into the preformed opening 10. The pressure is continued until the radiused apex 20 of the cone of the surface of the head reaches the bottom of the preformed opening. At this time the tool can be removed by pulling in the opposite direction. However, the angle of the surface of the head facing outwardly toward the surface of the tread is such that the stud is locked in position and the head remains bottomed in the preformed opening.

It will be appreciated that the elasticity of the rubber has much to do with the ease of insertion. With the very soft pliable treads, the angle $a$ is not as important as with the harder less pliable treads. With the latter, difficulty was experienced in inserting the stud with any force which can be exerted easily by a man leaning his weight on the tool C until the angle $a$ was less than 115°. As the angle was further decreased, the force required lessened rapidly until insertion became quite easy in even the hardest and least elastic tire treads.

Figure 4:
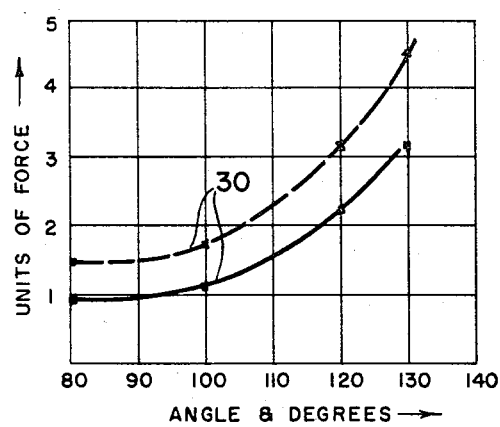

The forces required to force the stud into the preformed opening are a non-linear function of the included angle *a* of the head surface. FIGURE 4 shows a plot of the forces required for one tire tread tried both when the rubber is dry and when the rubber has been lubricated with a soapy water solution. As shown by curves 30, the forces required for an included angle of from 80–100° are relatively uniform. After the included angle is greater than 100°, the force required begin to go up sharply and when the included angle is 132° and greater, the forces are quite excessive and extreme difficulty was encountered in inserting the stud using any force.

At included angles of 115° and less, the forces are such that the stud moves easily into the preformed opening with some of the softer rubbers. With the more highly compounded stiffer rubbers, the angle should be less and an angle of 96° is preferred which, it has been found, will readily go into all conventional tire tread compounds.

Using the present invention, it has been found possible to insert tire studs into preformed openings in surfaces of tire treads without the use of the complicated expensive and fragile tools employed heretofore with the result that now the "do-it-yourselfers" or even garage station attendants can insert studs readily into their tires resulting in a substantial savings to everyone. Furthermore, should a stud accidentally be dislodged from a preformed opening, another stud can be readily reinserted by the owner of the automobile without the need for complicated tooling.

The invention has been described with reference to a preferred embodiment. Obviously modifications and alterations will occur to others upon a reading and understanding of this specification and it is my intention to include all such modifications and alterations insofar as they come within the scope of the present invention.

Having thus described my invention, I claim:

1. A tire stud adapted to be inserted into a preformed opening in the tread surface of an automobile tire, said opening having a predetermined diameter and a predetermined depth, said stud being comprised of a shank generally cylindrical in shape and a head at one end, said head having a diameter larger than the diameter of said opening and having a surface on the side remote from said shank adapted to be disposed against the base of said opening, the improvement which comprises the maximum diameter of said head being from three to five times the diameter of said opening, with said surface being generally in the shape of a cone with the maximum included angle of the cone at diameters equal to and greater than the diameter of said opening being between 80–115°.

2. The improvement of claim 1 wherein the apex of the cone inwardly of the diameter of the opening is a radius.

3. The method of installing a tire stud in a preformed opening in the surface of the tread of an automobile tire said opening having a predetermined diameter and a predetermined depth comprising providing a tire stud having a shank and a head at one end having a diameter of from three to five times the diameter of said opening, said shank having a diameter less than two times the diameter of said opening, said head having a surface remote from said shank generally in the shape of a cone defining an included angle of from 80–115°, providing an elongated tool having a hole at one end to receive said shank and an outer diameter less than the diameter of said head, positioning said shank in said hole, positioning said conical head at the open end of said preformed opening with the axis of the stud aligned with the axis of the opening, exerting an axial force on said stud sufficient for the conical surface of said head to dilate the opening in said tire tread, continuing such force until said head rests against the base of said opening and removing said tool by pulling.

References Cited
UNITED STATES PATENTS

| | | |
|---|---|---|
| 2,367,657 | 1/1945 | Boersma. |
| 2,876,485 | 3/1959 | Cowles. |
| 3,125,147 | 3/1964 | Hakka _____ 152—210 |
| 3,186,466 | 6/1965 | Keinanen _____ 152—210 |

CHARLIE T. MOON, *Primary Examiner.*